(12) United States Patent
Choo et al.

(10) Patent No.: US 7,531,678 B2
(45) Date of Patent: May 12, 2009

(54) PRODUCTION OF EDIBLE OIL

(75) Inventors: Yuen May Choo, Selangor Darul Ehsan (MY); Chiew Wei Puah, Selangor Darul Ehsan (MY); Ah Ngan Ma, Selangor Darul Ehsan (MY); Yusof Basiron, Selangor Darul Ehsan (MY)

(73) Assignee: Malaysian Palm Oil Board, Selangor Darul Ehsan (MY)

( * ) Notice: Subject to any disclaimer, the term of this patent is extended or adjusted under 35 U.S.C. 154(b) by 413 days.

(21) Appl. No.: 11/375,101

(22) Filed: Mar. 15, 2006

(65) Prior Publication Data
US 2007/0021625 A1 Jan. 25, 2007

(30) Foreign Application Priority Data
Jul. 20, 2005 (MY) .............................. PI 2005 3315

(51) Int. Cl.
*C11B 3/00* (2006.01)

(52) U.S. Cl. ..................... 554/174
(58) Field of Classification Search .................. 554/174
See application file for complete search history.

(56) References Cited

U.S. PATENT DOCUMENTS 7,247,739 B2 * 7/2007 Gapes et al. ................. 554/174

* cited by examiner

*Primary Examiner*—Deborah D Carr
(74) *Attorney, Agent, or Firm*—Birch, Stewart, Kolasch & Birch, LLP

(57) ABSTRACT

The present invention relates to a method for production of two types of edible oils, an oil type with high diacylglycerol content (DAG oil) containing at least 8 wt % diacylglycerol and another oil type with low diacylglycerol content (TAG oil) containing less than 8 wt % diacylglycerol, from a vegetable oil. The method comprises subjecting a vegetable oil to at least one stage of short-path distillation under vacuum level of not more than 0.01 Torr and at temperature of not more than 300° C., wherein DAG oil is obtained as distillate and whereas TAG oil is obtained as residue.

20 Claims, 2 Drawing Sheets

PRODUCTION OF EDIBLE OIL

FIELD OF INVENTION

The present invention relates to a method for production of two types of edible oils, an oil type with high diacylglycerol (DAG) content and another oil type with low diacylglycerol (DAG) content, from a vegetable oil by using short-path distillation.

BACKGROUND OF THE INVENTION

Recent studies have shown that oils containing DAG (DAG oils) can help consumers maintain a healthy weight when being used as part of a healthy diet. Both DAG oils and conventional triacylglycerol-based oils (TAG oils) are absorbed and digested in the same manner but different in how they are metabolized. Resulting from the difference in metabolic pathway, DAG has a lower tendency to be stored as body fat than TAG. These findings have spurred a wide spread interest in development of edible products containing DAG.

DAG oils are suitable to be used as cooking oil and in formulating oil/fat-based products but they are not suitable to be used as frying oil. The presence of DAG in oil during frying facilitates degradation of the oil, thus causing poor flavour in the fried product. Generally, it is desired that frying oil contains not more than 1.5% of DAG.

DAG oils are normally produced according to one of the following methods:

i) esterification of fatty acids with glycerol;
ii) transesterification of oils/fats with glycerol; and
iii) hydrolysis of oils/fats.

Lipase-catalyzed esterification of fatty acids with glycerol is the preferred method for producing DAG oils. This method is adopted by Kao Corporation for producing its highly successful DAG oil named Enova™ Oil and a description of this method is provided by U.S. Pat. No. 6,326,050.

Short-path distillation is used for processing edible oils whenever any valuable heat sensitive component contained therein, for example tocopherol, tocotrienol, phytosterol and squalene, needs to be distilled or when the oil itself is heat sensitive due to its high unsaturation level. Short-path distillation is also used for removing undesired components such as free fatty acid (FFA), pesticide and cholesterol from edible oils.

In production of DAG oils according to the methods as mentioned above, short-path distillation is normally used for purifying the crude DAG oils produced. Until now, short-path distillation has not been used directly for producing DAG oils.

SUMMARY OF THE INVENTION

The present invention relates to a method for production of two types of edible oils, an oil type with high diacylglycerol content (DAG oil) containing at least 8 wt % diacylglycerol and another oil type with low diacylglycerol content (TAG oil) containing less than 8 wt % diacylglycerol, from a vegetable oil. The method comprises subjecting a vegetable oil to at least one stage of short-path distillation under vacuum level of not more than 0.01 Torr and at temperature of not more than 300° C., wherein DAG oil is obtained as distillate and whereas TAG oil is obtained as residue.

The preferred vegetable oil is palm oil and/or palm kernel oil. The vegetable oil used is preferably refined and bleached prior to being subjected to the short-path distillation process.

Preferably, the temperature used for conducting the short-path distillation on the vegetable oil ranges from 150° C. to 300° C. When the temperature used ranges from 150° C. to 240° C., the DAG oil obtained contains at least 1 wt % of Vitamin E, at least 1 wt % of phytosterols and at least 1 wt % of squalene. If the temperature used ranges from 210° C. to 230° C., the DAG oil obtained also contains at least 50 wt % of diacylglycerol. When the temperature used ranges from 240° C. to 300° C., the DAG oil obtained contains not more than 1.5 wt % of free fatty acid and/or monoacylglycerol while the TAG oil obtained contains not more than 1.5 wt % of diacylglycerol.

The TAG oil obtained as residue from the initial stage of short-path distillation can be subjected to at least one more stage of short-path distillation under vacuum level of not more than 0.01 Torr and at temperature of not more than 300° C. wherein a second portion of DAG oil is obtained as distillate and a second portion of TAG oil is obtained as residue.

Preferably, the temperature used for conducting the short-path distillation on the TAG oil obtained as residue from the initial stage of short-path distillation ranges from 150° C. to 300° C. The second portion of DAG oil obtained contains not more than 1.5 wt % of free fatty acid and/or monoacylglycerol. When the temperature used ranges from 240° C. to 300° C., the second portion of TAG oil obtained contains not more than 1.5 wt % of diacylglycerol.

DETAILED DESCRIPTION OF THE INVENTION

Figure 1:
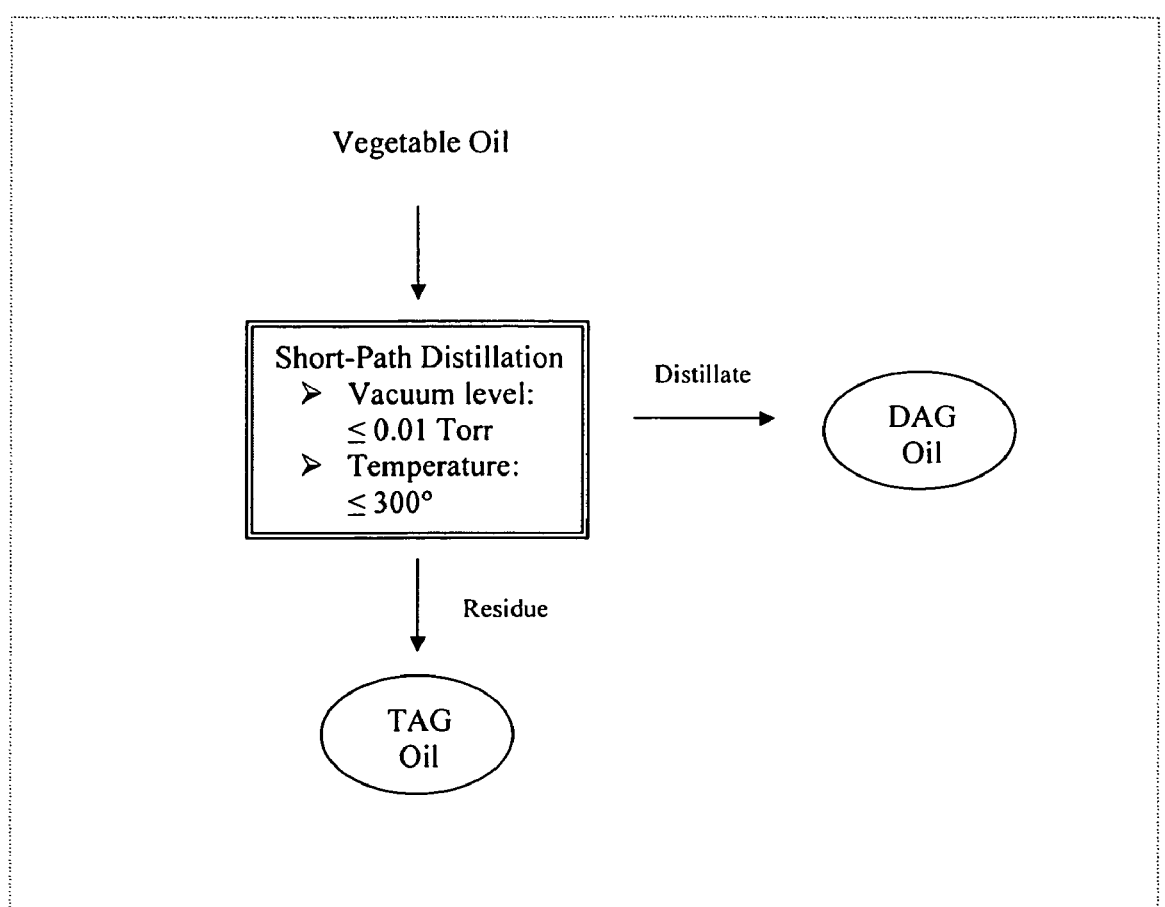
FIG. 1 is a diagram showing the method of present invention for simultaneously producing DAG oil and TAG oil by using a one-stage short-path distillation process.
Figure 2:
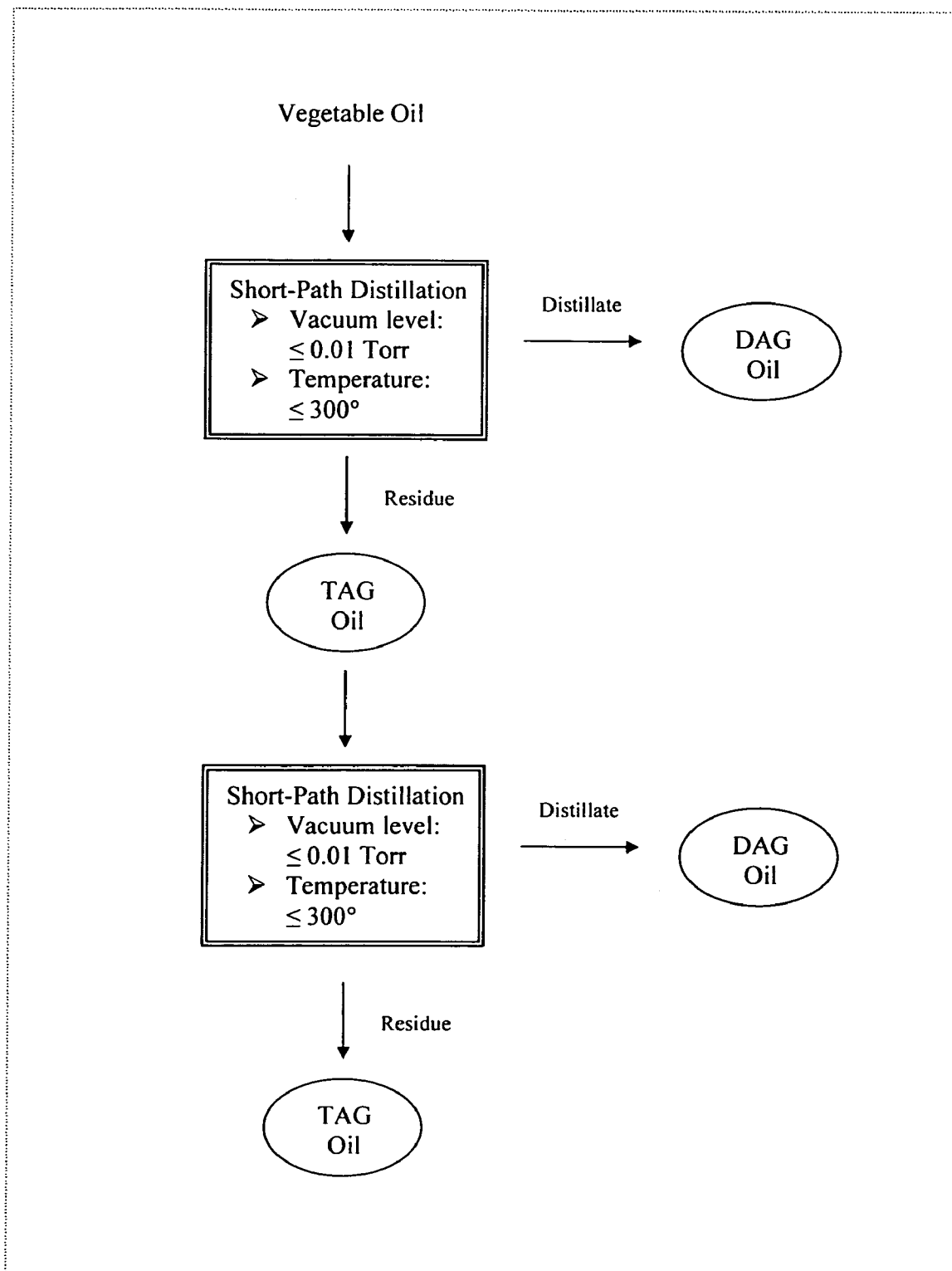
FIG. 2 is a diagram showing the method of present invention for simultaneously producing DAG oil and TAG oil by using a two-stage short-path distillation process.

The present invention relates to a method for simultaneously producing two types of edible oils, an oil type being of high diacylglycerol (DAG) content with DAG content of at least 8 wt % (hereinafter referred to as DAG oil) and another type being of low diacylglycerol (DAG) content with DAG content of less than 8 wt % (hereinafter referred to as TAG oil), from a vegetable oil. The DAG oil preferably contains not more than 1.5 wt % of free fatty acid (FFA) and/or monoacylglycerol (MAG), while the TAG oil preferably contains not more than 1.5 wt % of diacylglycerol (DAG).

The method comprises subjecting a vegetable oil to at least one stage of short-path distillation under vacuum level of not more than 0.01 Torr (10 mTorr) and at temperature of not more than 300° C., preferably at temperature ranging from 150° C. to 300° C., whereby DAG oil is obtained as distillate and whereas TAG oil is obtained as residue from the short-path distillation process.

The vegetable oil is selected based on its natural content of DAG. A vegetable oil with high natural content of DAG, such as palm oil and palm kernel oil, is preferred. The vegetable oil is preferably refined and bleached prior to being subjected to the short-path distillation process.

When the temperature used for conducting the short-path distillation process ranges from 150° C. to 240° C., the DAG oil obtained contains high level of valuable phytonutrients: at least 1 wt % Vitamin E; at least 1 wt % phytosterols; at least 1 wt % squalene. A disadvantage associated with this temperature range is that the DAG oil obtained contains more than 1.5 wt % of FFA and/or MAG, and the TAG oil obtained contains more than 1.5 wt % of DAG. To obtain DAG oil with DAG content of at least 50 wt % and at the same time containing high level of valuable phytonutrients, the temperature suitable for conducting the short-path distillation process ranges from 210° C. to 230° C. If it is desired to reduce the FFA and/or MAG content of the DAG oil, it could be done by purifying the DAG oil without destroying its valuable phytonutrients content using any conventional method, for example short-path distillation or steam distillation.

On the other hand, when the temperature used for conducting the short-path distillation process ranges from 240° C. to 300° C., the DAG oil obtained contains not more than 1.5 wt % of FFA and/or MAG. On top of that, the TAG oil obtained contains not more than 1.5 wt % of DAG. A disadvantage associated with this temperature range is that the DAG oil obtained contains low level of valuable phytonutrients.

The residue (TAG oil) obtained from the initial stage (hereinafter referred to as-the first stage) of short-path distillation can be subjected to at least one more stage (hereinafter referred to as the second stage) of short-path distillation under vacuum level of not more than 0.01 Torr (10 mTorr) and at temperature of not more than 300° C., preferably at temperature ranging from 150° C. to 300° C., whereby a second portion of DAG oil is obtained as distillate and a second portion of TAG oil is obtained as residue from the second stage of short-path distillation process.

When the temperature used for conducting the second stage of short-path distillation ranges from 150° C. to 240° C., the second portion of DAG oil obtained contains negligible amount of FFA and/or MAG but the second portion of TAG oil obtained still contains more than 1.5 wt % of DAG. To render the second portion of DAG oil with not more than 1.5 wt % of FFA and/or MAG and the second portion of TAG oil with not more than 1.5 wt % of DAG, the temperature suitable for conducting the second stage of short-path distillation ranges from 240° C. to 300° C.

Various embodiments of the method of present invention are presented as examples in a non-limiting sense.

EXAMPLE 1

A portion of RBD palm olein was subjected to short-path distillation under vacuum level of not more than 0.01 Torr and at temperature of 150° C. by using a pilot plant wiped-film short-path distillation unit (Pope Scientific Inc., USA). The feed rate of RBD palm olein was maintained at 6.0-8.5 ml per minute. The vacuum level and temperature were maintained constant throughout the short-path distillation process. The distillate and residue collected were analyzed for their respective content of FFA, MAG, DAG, TAG, Vitamin E, sterols and squalene.

The residue collected was subjected to a second stage of short-path distillation under the same condition as specified above. The distillate and residue collected from the second stage of short-path distillation were also analyzed for their respective content of FFA, MAG, DAG, TAG, Vitamin E, sterols and squalene.

Results of the analysis are tabulated in Table 1.

EXAMPLE 2

The steps in Example 1 were repeated for another five portions of RBD palm olein under the same vacuum level but at different temperature for each portion of RBD palm olein. For the first portion, the steps were repeated at temperature of 170° C.; 190° C. for the second portion; 210° C. for the third portion; 230° C. for the forth portion and 250° C. for the fifth portion.

Results of the analysis done on all the distillate and residue collected are also tabulated in Table 1.

Unlike the prior art methods for production of DAG oil which would destroy the natural content of phytonutrients, particularly phytosterols, of the starting oils/fats used resulting in a DAG oil with negligible content of phytonutrients, the present method is able to preserve the natural content of phytonutrients of the starting oils/fats used resulting in a DAG oil with high content of phytonutrients. On top of that, the present method also produces TAG oil with reduced content of DAG. Hence, the TAG oil produced according to the present method exhibits high oxidative stability.

The DAG oil produced according to the present method contains powerful antioxidant including Vitamin E, phytosterols and squalene. It can be used for food preparation and especially for producing health food products or health supplements which can be consumed for controlling cholesterol level and/or for maintaining healthy weight.

TABLE 1

| Distillation Temperature (° C.) | First (1st) or Second (2nd) Stage Distillation | Distillate (D) or Residue (R) | Components | | | | | | |
|---|---|---|---|---|---|---|---|---|---|
| | | | FFA | | MAG | | DAG | | TAG |
| | | | Concentration (%) | Recovery (%) | Concentration (%) | Recovery (%) | Concentration (%) | Recovery (%) | Concentration (%) |
| 150 | 1st Oil Feed = ~5350 g | D = ~45.17 g | 4.604 | 75.15 | 2.581 | 32.04 | 42.65 | 6.62 | 43.06 |
| | | R = ~5250 g | N.D | N.D | 0.0290 | 41.83 | 3.768 | 67.95 | 96.10 |
| | 2nd Oil Feed = ~4486 g | D = ~20 g | N.D | N.D | 1.91 | 29.37 | 15.66 | 1.85 | 73.22 |
| | | R = ~4466 g | N.D | N.D | N.D | N.D | 12.48 | 84.88 | 87.27 |
| 170 | 1st Oil Feed = ~5350 g | D = ~22.88 g | 8.846 | 73.14 | 8.211 | 51.62 | 8.189 | 0.64 | 52.75 |
| | | R = ~5316 g | N.D | N.D | N.D | N.D | 5.293 | 96.66 | 94.63 |
| | 2nd Oil Feed = ~4486 g | D = ~10 g | N.D | N.D | N.D | N.D | 29.37 | 1.10 | 56.32 |
| | | R = ~4478 g | N.D | N.D | N.D | N.D | 8.15 | 64.46 | 91.76 |

TABLE 1-continued

| Temp (°C) | Stage | D or R | | TAG | | Vitamin E | | Sterols | | Squalene | |
|---|---|---|---|---|---|---|---|---|---|---|---|
| 190 | 1st Oil Feed = ~5350 g | D = ~30.17 g | | 9.072 | 98.35 | 12.08 | 99.59 | 24.45 | 2.52 | 29.26 | |
| | | R = ~5300 g | | N.D | N.D | N.D | N.D | 5.305 | 96.58 | 94.65 | |
| | 2nd Oil Feed = ~4486 g | D = ~27 g | | N.D | N.D | N.D | N.D | 36.25 | 4.14 | 58.93 | |
| | | R = ~4460 g | | N.D | N.D | N.D | N.D | 6.41 | 62.76 | 93.58 | |
| 210 | 1st Oil Feed = ~5350 g | D = ~53.73 g | | 5.194 | 99.48 | 6.750 | 98.29 | 64.65 | 11.77 | 7.685 | |
| | | R = ~5290 g | | N.D. | N.D | N.D | N.D | 4.588 | 83.50 | 95.41 | |
| | 2nd Oil Feed = ~4486 g | D = ~35 g | | N.D | N.D | N.D | N.D | 43.25 | 7.34 | 50.72 | |
| | | R = ~4450 g | | N.D | N.D | N.D | N.D | 5.10 | 55.96 | 94.90 | |
| 230 | 1st Oil Feed = ~5400 g | D = ~99.73 g | | 2.550 | 92.16 | 3.629 | 99.72 | 50.14 | 17.22 | 35.93 | |
| | | R = ~5200 g | | N.D | N.D | N.D | N.D | 4.56 | 81.46 | 95.43 | |
| | 2nd Oil Feed = ~4486 g | D = ~125 g | | N.D | N.D | N.D | N.D | 42.36 | 26.09 | 56.89 | |
| | | R = ~4360 g | | N.D | N.D | N.D | N.D | 1.90 | 19.92 | 98.10 | |
| 250 | 1st Oil Feed = ~5400 g | D = ~455 g | | 0.557 | 91.72 | 0.490 | 61.27 | 41.88 | 65.53 | 55.33 | |
| | | R = ~4940 g | | N.D | N.D | N.D | N.D | 0.811 | 15.44 | 99.18 | |
| | 2nd Oil Feed = ~4486 g | D = ~140 g | | N.D | N.D | N.D | N.D | 15.16 | 58.36 | 83.93 | |
| | | R = ~4345 g | | N.D | N.D | N.D | N.D | 0.89 | 24.27 | 99.11 | |

| Distillation Temperature (°C) | First (1st) or Second (2nd) Stage Distillation | Distillate (D) or Residue (R) | TAG Recovery (%) | Vitamin E Concentration (%) | Vitamin E Recovery (%) | Sterols Concentration (%) | Sterols Recovery (%) | Squalene Concentration (%) | Squalene Recovery (%) |
|---|---|---|---|---|---|---|---|---|---|
| 150 | 1st Oil Feed = ~5350 g | D = ~45.17 g | 0.38 | 3.561 | 24.61 | 1.968 | 31.63 | 1.572 | 61.63 |
| | | R = ~5250 g | 99.39 | 0.0820 | 65.87 | 0.0249 | 46.52 | N.D | N.D |
| | 2nd Oil Feed = ~4486 g | D = ~20 g | 0.34 | 3.95 | 21.47 | 1.04 | 18.62 | N.D | N.D |
| | | R = ~4466 g | 30.51 | 0.19 | 77.84 | 0.04 | 58.93 | N.D | N.D |
| 170 | 1st Oil Feed = ~5350 g | D = ~22.88 g | 0.238 | 13.23 | 46.31 | 3.763 | 30.63 | 5.012 | 99.53 |
| | | R = ~5316 g | 99.11 | 0.0470 | 38.23 | 0.0325 | 61.41 | N.D | N.D |
| | 2nd Oil Feed = ~4486 g | D = ~10 g | 0.118 | 4.63 | 19.59 | 3.64 | 22.30 | N.D | N.D |
| | | R = ~4478 g | 96.80 | 0.07 | 59.26 | 0.03 | 32.42 | N.D | N.D |
| 190 | 1st Oil Feed = ~5350 g | D = ~30.17 g | 0.173 | 13.63 | 62.55 | 7.822 | 83.5 | 3.688 | 96.04 |
| | | R = ~5300 g | 98.84 | 0.0328 | 26.60 | 0.0076 | 14.39 | N.D | N.D |
| | 2nd Oil Feed = ~4486 g | D = ~27 g | 0.377 | 1.06 | 19.58 | 1.07 | 85.06 | N.D | N.D |
| | | R = ~4460 g | 98.28 | 0.01 | 13.33 | N.D | N.D | N.D | N.D |
| 210 | 1st Oil Feed = ~5350 g | D = ~53.73 g | 0.08 | 8.379 | 67.94 | 5.275 | 99.49 | 2.068 | 95.12 |
| | | R = ~5290 g | 99.58 | 0.0042 | 3.40 | N.D | N.D | N.D | N.D |
| | 2nd Oil Feed = ~4486 g | D = ~35 g | 0.41 | 4.43 | 82.14 | N.D | N.D | N.D | N.D |
| | | R = ~4450 g | 98.71 | N.D | N.D | N.D | N.D | N.D | N.D |
| 230 | 1st Oil Feed = ~5400 g | D = ~99.73 g | 0.71 | 4.217 | 64.51 | 2.423 | 86.21 | 1.119 | 97.12 |
| | | R = ~5200 g | 97.77 | 0.0054 | 4.30 | N.D | N.D | N.D | N.D |
| | 2nd Oil | D = | 1.67 | 0.16 | 83.38 | N.D | N.D | N.D | N.D |

TABLE 1-continued

|   | Feed = ~4486 g | ~125 g R = ~4360 g | 99.91 | N.D | N.D | N.D | N.D | N.D | N.D |
|---|---|---|---|---|---|---|---|---|---|
| 250 | 1$^{st}$ Oil Feed = ~5400 g | D = ~455 g R = ~4940 g | 3.31 72.21 | 1.137 0.0043 | 79.26 3.65 | 0.455 N.D | 73.78 N.D | 0.153 N.D | 60.30 N.D |
|   | 2$^{nd}$ Oil Feed = ~4486 g | D = ~140 g R = ~4345 g | 2.64 96.78 | 0.10 N.D | 72.14 N.D | N.D N.D | N.D N.D | N.D N.D | N.D N.D |

*N.D—Non-Detectable

The invention claimed is:

1. A method for production of two types of edible oils, an oil type with high diacylglycerol content (DAG oil) containing at least 8 wt % diacylglycerol and another oil type with low diaeylglycerol content (TAG oil) containing less than 8 wt % diacylglycerol, from a vegetable oil wherein the method comprises subjecting a vegetable oil to at least one stage of short-path distillation under vacuum level of not more than 0.01 Torr and at temperature of not more than 300° C., wherein DAG oil containing at least 8 wt % diacylglycerol is obtained as distillate and whereas TAG oil containing less than 8 wt % diacylglycerol is obtained as residue.

2. A method as claimed in claim 1 wherein the vegetable oil used is palm oil and/or palm kernel oil.

3. A method as claimed in claim 1 wherein the vegetable oil used is refined and bleached prior to being subjected to the short-path distillation process.

4. A method as claimed in claim 1 wherein The temperature used for conducting the short-path distillation on the vegetable oil ranges from 150° C. to 300° C.

5. A method as claimed in claim 4 wherein The temperature used for conducting The short-path distillation on the vegetable oil ranges from 150° C to 240° C.

6. A method as claimed in claim 5 wherein the temperature used for conducting the short-path distillation on the vegetable oil ranges from 210° C. to 230° C.

7. A method as claimed in claim 4 wherein the temperature used for conducting the short-path distillation on the vegetable oil ranges from 240° C. to 300° C.

8. A method as claimed in claim 5 wherein the DAG oil obtained contains at least 1 wt % of Vitamin E.

9. A method as claimed in claim 5 wherein the DAG oil obtained contains at least 1 wt % of phytosterols.

10. A method as claimed in claim 5 wherein the DAG oil obtained contains at least 1 wt % of squalene.

11. A method as claimed in claim 6 wherein the DAG oil obtained contains at least 50 wt % of diacylglycerol.

12. A method as claimed in claim 7 wherein The DAG oil obtained contains not more than 1.5 wt % of free fatty acid and/or monoacylglycerol.

13. A method as claimed in claim 1 wherein the TAG oil obtained contains not more than 1.5 wt % of diacylglycerol.

14. A method as claimed in claim 1 wherein the TAG oil obtained as residue is subjected to at least one more stage of short-path distillation under vacuum level of not more than 0.01 Torr and at temperature of not more than 300° C. wherein a second portion of DAG oil is obtained as distillate and a second portion of TAG oil is obtained as residue.

15. A method as claimed in claim 14 wherein the temperature used for conducting the short-path distillation on the TAG oil obtained as residue ranges from 150° C to 300° C.

16. A method as claimed in claim 14 wherein the second portion of DAG oil obtained contains not more than 1.5 wt % of flee fatty acid and/or monoacylglycerol.

17. A method as claimed in claim 15 wherein the temperature used for conducting the short-path distillation on the TAG oil obtained as residue ranges from 240° C. to 300° C.

18. A method as claimed in claim 17 wherein the second portion of TAG oil obtained contains not more than 1.5 wt % of diacylglycerol.

19. An edible oil having a high diacylglycerol content (DAG oil) containing at least 8 wt % diacylglycerol produced in a process comprising subjecting a vegetable oil to at least one stage of short-path distillation under vacuum level of not more than 0.01 Torr and at a temperature of not more than 300° C., wherein the DAG oil containing at least 8 wt % diacylglycerol is obtained as distillate.

20. An edible oil having a low diacylglycerol content (TAG oil) containing less than 8 wt % diacylglycerol produced in a process comprising subjecting a vegetable oil to at least one stage of short-path distillation under vacuum level of not more than 0.01 Torr and at a temperature of not more than 300° C., wherein the TAG oil containing less than 8 wt % diacylglycerol is obtained as a residue.

* * * * *